(12) United States Patent
Kato et al.

(10) Patent No.: US 7,451,869 B2
(45) Date of Patent: Nov. 18, 2008

(54) ARTICLE CARRYING APPARATUS

(75) Inventors: Heizaburo Kato, Shizuoka (JP);
Toshinao Kato, Shizuoka (JP)

(73) Assignee: Sankyo Seisakusho Co., Tokyo (JP)

( * ) Notice: Subject to any disclaimer, the term of this patent is extended or adjusted under 35 U.S.C. 154(b) by 413 days.

(21) Appl. No.: 11/260,046

(22) Filed: Oct. 26, 2005

(65) Prior Publication Data

US 2006/0108205 A1 May 25, 2006

(30) Foreign Application Priority Data

| Oct. 26, 2004 | (JP) | ............................. 2004-310751 |
| Oct. 27, 2004 | (JP) | ............................. 2004-313001 |
| Oct. 29, 2004 | (JP) | ............................. 2004-315727 |

(51) Int. Cl.
*B65G 25/04* (2006.01)

(52) U.S. Cl. .................. 198/750.8; 198/759; 198/774.3

(58) Field of Classification Search ............. 198/750.1, 198/750.8, 759, 766, 774.3, 756, 757
See application file for complete search history.

(56) References Cited

U.S. PATENT DOCUMENTS

| 3,032,174 | A | | 5/1962 | Lake et al. |
| 3,099,348 | A | * | 7/1963 | Algatt et al. ............. 198/750.8 |
| 4,362,455 | A | * | 12/1982 | Hirose ......................... 198/757 |
| 5,178,258 | A | * | 1/1993 | Smalley et al. ........... 198/750.8 |
| 6,598,733 | B2 | * | 7/2003 | Kato ........................ 198/750.1 |
| 6,708,815 | B2 | * | 3/2004 | Kato ........................ 198/750.8 |

FOREIGN PATENT DOCUMENTS

| EP | 1 279 627 A1 | 1/2003 |
| FR | 646.854 | 11/1928 |
| JP | 58-006810 | 1/1983 |
| JP | 63-24891 | 5/1988 |

OTHER PUBLICATIONS

European Search Report dated Mar. 2, 2006.
Examination Report dated Jul. 16, 2007.
Office Action mailed Oct. 27, 2006 in the Korean Patent Application No. 10-2005-0099652 corresponding to this U.S. Appl. No. 11/260,046 ( pp. 4-two-page English translation of the Office Action, and two-page Korean language Office Action).

* cited by examiner

*Primary Examiner*—James R Bidwell
(74) *Attorney, Agent, or Firm*—Edwards Angell Palmer & Dodge LLP; John J. Penny, Jr.

(57) ABSTRACT

An article carrying apparatus is capable of carrying an article efficiently and correctly. The article carrying apparatus for carrying an article, includes: a housing; an input shaft rotatably supported by the housing; an output section supported by the housing in such a manner that the output section can oscillate and reciprocate; an article carry section that oscillates and reciprocates integrally with the output section; a first cam mechanism that moves in conjunction with the input shaft and oscillates the output section, wherein the first cam mechanism includes a first cam having a cam face that maintains a contact state with the output section during reciprocation of the output section, and a contact position at which the output section and the cam face contact one another moves in the same direction as a reciprocating direction in which the output section reciprocates; and
a second cam mechanism that moves in conjunction with the input shaft and reciprocates the output section.

12 Claims, 12 Drawing Sheets

ARTICLE CARRYING APPARATUS

CROSS-REFERENCE TO RELATED APPLICATIONS

The present application claims priority upon Japanese Patent Application No. 2004-310751 filed on Oct. 26, 2004, Japanese Patent Application No. 2004-313001 filed on Oct. 27, 2004, and Japanese Patent Application No. 2004-315727 filed on Oct. 29, 2004, which are incorporated herein by reference.

BACKGROUND OF THE INVENTION

1. Field of the Invention

The present invention relates to article carrying apparatuses.

2. Description of the Related Art

Conventionally, various types of article carrying apparatuses (hereinafter, referred to as "parts feeders"), such as vibration-, rotation-, oscillation-, and belt-type parts feeders, for aligning articles such as bulk components while carrying them, and supplying the articles one at a time, have been proposed. Among these, vibration-type parts feeders are the most common.

A vibration-type parts feeder is an apparatus configured so as to align and carry articles placed on a face that vibrates by utilizing the phenomena of relative sliding and jumping between the articles and the face.

FIG. 14 shows an example of such a vibration-type parts feeder. This vibration-type parts feeder 51 includes a base 52, a bowl 54 that is disposed above the base 52 with a predetermined spacing, a plurality of a pair of support springs 53 that is provided between the base 52 and the bowl 54 and that elastically supports the bowl 54 above the base 52, and an electromagnet 56 that is provided on the base 52 and that can attract the bowl 54.

In the vibration-type parts feeder 51 having such a configuration, when an AC voltage at a predetermined frequency is applied to the electromagnet 56, the bowl 54 vibrates corresponding to that frequency, and with this vibration of the bowl 54, articles 57 accommodated in the bowl 54 are carried while being aligned, and supplied one at a time from a gate 55.

With the vibration-type parts feeder 51 having the configuration as described above, there are various problems such as the followings: it takes time and effort to adjust the components; the articles 57 are magnetized; and noise is generated. In particular, the problem of noise is inevitable because the articles 57 are carried while jumping with respect to the bowl 54.

On the other hand, in order to address the problems as described above, various types of vibration-type parts feeders in which a cam mechanism is used as the drive source have been proposed. For example, a vibration-type parts feeder described in JP S63-24891B includes a bowl that is supported so as to be rotationally movable around the central axis, and a cam mechanism that causes the bowl to perform horizontal, rotational vibration with a large difference in the acceleration between the forward movement and the backward movement, and is configured so that articles in the bowl are carried by the friction and the inertial force working in cooperation.

In the vibration-type parts feeder like this, since, for example, the cam mechanism is used and the articles do not jump on the bowl because the bowl oscillates only in the horizontal direction and does not reciprocate in the vertical direction, the problem of generation of noise can be eliminated.

However, in the vibration-type parts feeder having such a configuration, since the bowl oscillates only in the horizontal direction and does not reciprocate in the vertical direction, the articles on the bowl are constantly in contact with the bowl with a predetermined force because of the effect of gravity. Thus, the articles on the bowl cannot be carried efficiently. Moreover, since correct and stable operation cannot be achieved, the articles cannot be carried accurately (see JP S63-24891B, for example).

In general, in order to carry the articles on the bowl, it is preferable that the contact pressure of the articles with respect to the bowl is different between when the bowl moves in the carrying direction of the articles and when the bowl moves in the reverse direction from the carrying direction. That is, it is preferable that when the bowl moves in the carrying direction of the articles, the articles are brought into contact with the bowl with a strong force, thereby inhibiting sliding of the articles with respect to the bowl and carrying them forward, and conversely, when the bowl moves in the direction opposite to the carrying direction of the articles, the articles are brought into contact with the bowl with a slight force, thereby promoting sliding of the articles with respect to the bowl and inhibiting them from returning to the direction opposite to the carrying direction.

SUMMARY OF THE INVENTION

The present invention was arrived at in light of these issues of the conventional art, and it is an object thereof to provide an article carrying apparatus that is capable of carrying the articles efficiently and accurately without generating noise.

An aspect of the present invention is an article carrying apparatus for carrying an article, comprising: a housing; an input shaft rotatably supported by the housing; an output section supported by the housing in such a manner that the output section can oscillate and reciprocate; an article carry section that oscillates and reciprocates integrally with the output section; a first cam mechanism that moves in conjunction with the input shaft and oscillates the output section, the first cam mechanism being provided on and rotating integrally with the input shaft, wherein the first cam mechanism includes a first cam having a cam face formed on both of the side surfaces thereof that maintains a contact state with the output section during reciprocation of the output section, and a contact position at which the output section and the cam face contact one another moves in the same direction as reciprocating direction in which the output section reciprocates; and a second cam mechanism that moves in conjunction with the input shaft and reciprocates the output section, wherein the first cam mechanism includes a first contact element that is provided on the output section and moves integrally with the output section, the first contact element comprising a pair of cam followers; and wherein the cam followers are respectively in contact with the cam faces; characterized in that an axis of each of the cam followers is in a direction perpendicular to an axis of the input shaft; and in that the cam surfaces are formed as curved surfaces perpendicularly rising from the outer surface of the input shaft.

Features of the present invention other than the above will become clear by reading the description of the present specification with reference to the accompanying drawings.

BRIEF DESCRIPTION OF THE DRAWINGS

For more complete understanding of the present invention and the advantages thereof, reference is now made to the following description taken in conjunction with the accompanying drawings wherein.

DETAILED DESCRIPTION OF THE INVENTION

Figure 1:
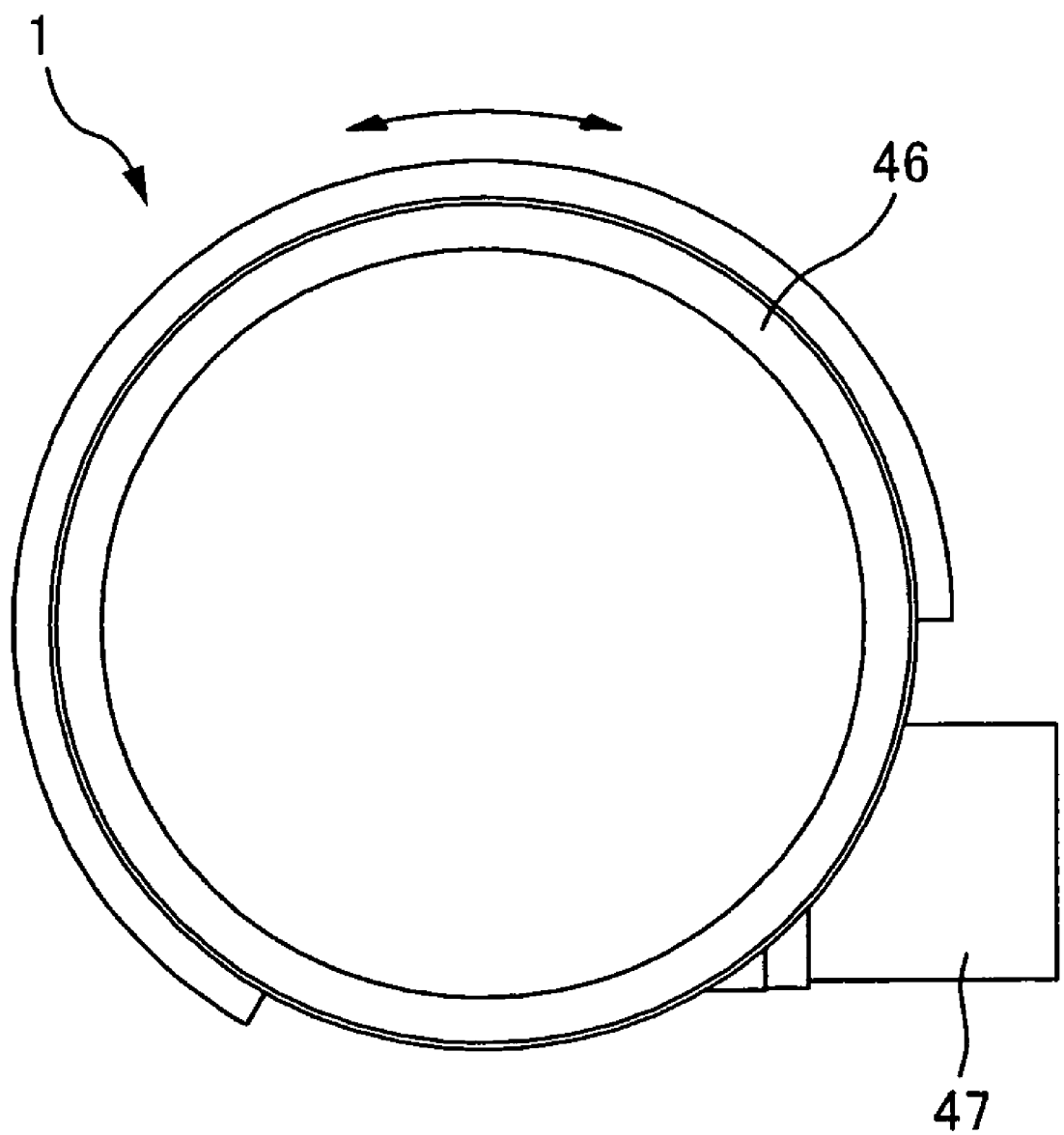
FIG. 1 is a plan view showing an embodiment of an article carrying apparatus according to an embodiment thereof.

At least the following matters will be made clear by the explanation in the present specification and the description of the accompanying drawings.

An aspect of the present invention is an article carrying apparatus for carrying an article, including: a housing; an input shaft rotatably supported by the housing; an output section supported by the housing in such a manner that the output section can oscillate and reciprocate; an article carry section that oscillates and reciprocates integrally with the output section; a first cam mechanism that moves in conjunction with the input shaft and oscillates the output section, wherein the first cam mechanism includes a first cam having a cam face that maintains a contact state with the output section during reciprocation of the output section, and a contact position at which the output section and the cam face contact one another moves in the same direction as a reciprocating direction in which the output section reciprocates; and a second cam mechanism that moves in conjunction with the input shaft and reciprocates the output section.

This article carrying apparatus is configured so that the first cam mechanism oscillates the article carry section via the output section and the second cam mechanism reciprocates the article carry section via the output section, and thus the oscillating operation and the reciprocating operation of the article carry section can be optimized.

In this case, since the first cam mechanism and the second cam mechanism both move in conjunction with the input shaft, the timings of the oscillation and the reciprocation of the article carry section can be matched correctly, and thus the article can be carried efficiently.

Furthermore, the first cam mechanism includes a first cam having a cam face that maintains a contact state with the output section during reciprocation of the output section and the contact position between the output section and the cam face moves in the same direction as the reciprocating direction of the output section. Therefore, the contact position between the first cam of the first cam mechanism and the output section does not change in the oscillating direction. Therefore, unintended oscillating operation is not added to the output section, and thus the article can be carried efficiently and correctly.

In this article carrying apparatus, it is preferable that the first cam mechanism is constituted by a first contact element that is provided to the output section and moves integrally with the output section, and the first cam that is provided on the input shaft, that rotates integrally with the input shaft, and that has on its side surface the cam face that is constantly in contact with the first contact element; and, during reciprocation of the output section, the contact position between the first contact element and the cam face of the first cam moves in the same direction as the reciprocating direction of the output section while the first contact element and the cam face maintain the contact state.

This article carrying apparatus is configured such that the first cam mechanism is constituted by a first contact element that is provided to the output section and moves integrally with the output section, and the first cam that is provided on the input shaft, that rotates integrally with the input shaft, and that has on its side surface the cam face that is constantly in contact with the first contact element; and, during reciprocation of the output section, the contact position between the first contact element and the cam face of the first cam moves in the same direction as the reciprocating direction of the output section while the first contact element and the cam face maintain the contact state. Therefore, the contact position between the cam face of the first cam and the first contact element in the output section, of the first cam mechanism, does not change in the oscillating direction during the reciprocation of the output section.

Therefore, unintended oscillating operation is not added to the output section, and thus the article can be carried efficiently and correctly.

In this article carrying apparatus, it is preferable that the output section is provided with a pair of the first contact elements; the cam face is formed on both of the side surfaces of the first cam; and the first contact elements are respectively in contact with the cam faces.

With this article carrying apparatus, the output section is provided with the pair of first contact elements and the cam face is formed on each of both side surfaces of the first cam, and the first contact elements are respectively in contact with the cam faces. Therefore, the first cam can be held between the two first contact elements from both its side surfaces. Therefore, during the reciprocation of the output section, the contact positions between the cam faces of the first cam and the first contact elements in the output section, of the first cam mechanism, do not change in the oscillating direction, so that unintended oscillating operation is not added to the output section, and thus the article can be carried efficiently and correctly.

In this article carrying apparatus, it is preferable that the second cam mechanism is constituted by a second contact element that is provided to the output section and moves integrally with the output section, and a second cam that is provided on the input shaft, that rotates integrally with the input shaft, and that has on its circumferential surface a cam face that is constantly in contact with the second contact element; and, during oscillation of the output section, a contact position between the second contact element and the cam face of the second cam moves in a direction parallel to a rotation axis of the second cam while the second contact element and the cam face maintain the contact state.

This article carrying apparatus is configured such that the second cam mechanism is constituted by a second contact element that is provided to the output section and moves integrally with the output section, and a second cam that is provided on the input shaft, that rotates integrally with the input shaft, and that has on its circumferential surface a cam face that is constantly in contact with the second contact element; and, during oscillation of the output section, a contact position between the second contact element and the cam face of the second cam moves in a direction parallel to a rotation axis of the second cam while the second contact element and the cam face maintain the contact state. Therefore, during the oscillation of the output section, the second cam and the second contact element of the second cam mechanism do not prevent the oscillating operation of the output section, and thus the article can be carried efficiently and correctly.

In this article carrying apparatus, it is preferable that the output section is provided with a pair of the second contact elements; and the input shaft is provided with a pair of the second cams that respectively have on their circumferential surfaces the cam faces that are respectively in contact with the second contact elements.

With this article carrying apparatus, the output section is provided with the pair of second contact elements, and the input shaft is provided with a pair of the second cams that respectively have on their circumferential surfaces the cam faces that are respectively in contact with the second contact elements. Therefore, during the oscillation of the output section, the second cams and the second contact elements of the second cam mechanism do not prevent the oscillating operation of the output section, and thus the article can be carried efficiently and correctly.

In this article carrying apparatus, it is preferable that the second contact element is biased toward the second cam by a biasing member provided between the housing and the second contact element.

With this article carrying apparatus, the second contact element is biased toward the second cam by the biasing member provided between the housing and the second contact element. Therefore, during the oscillation of the output section, the second cam and the second contact element of the second cam mechanism do not prevent the oscillating operation of the output section, and thus the article can be carried efficiently and correctly.

In this article carrying apparatus, it is preferable that the second contact element is provided with an engagement section for engaging with the second cam, and configured so that an inner surface of the engagement section and the circumferential surface of the second cam are constantly in contact with each other.

With this article carrying apparatus, the second contact element is provided with the engagement section for engaging with the second cam, and configured so that the inner surface of the engagement section and the circumferential surface of the second cam are constantly in contact with each other, so that the output section can be oscillated and reciprocated reliably, and thus the article can be carried efficiently and correctly.

In this article carrying apparatus, it is preferable that the output section is configured so as to oscillate in the horizontal direction and reciprocate in the vertical direction.

With this article carrying apparatus, the output section is configured so as to oscillate in the horizontal direction and reciprocate in the vertical direction. Therefore, the article can be carried efficiently by utilizing the effect of gravity.

In this article carrying apparatus, it is preferable that, when the article carry section oscillates integrally with the output section in a carrying direction of the article, a time required for the article carry section to move from a first point to a second point is set to be longer than a time required for the article carry section to move from the second point to the first point.

With this article carrying apparatus, since a time required for the article carry section to move from a first point to a second point is set to be longer than a time required for the article carry section to move from the second point to the first point when the article carry section oscillates integrally with the output section in the carrying direction of the article, the article can be carried efficiently.

In this article carrying apparatus, it is preferable that, in an oscillating operation of the article carry section, the article carry section moves at a constant velocity for a predetermined time during a period from the start of movement of the article in the carrying direction to the end of the movement.

This article carrying apparatus is configured such that, in the oscillating operation of the article carry section, the article carry section moves at a constant velocity for a predetermined time during a period from the start of movement of the article in the carrying direction to the end of the movement. Therefore, during the constant-velocity motion of the article carry section, the force due to the acceleration of the article carry section and acting of the article does not occur with respect to the article on the article carry section. Thus, sliding of the article with respect to the article carry section does not occur, and the article can thus be carried correctly.

In this article carrying apparatus, it is preferable that, when the velocity at which the article carry section moves upward is increasing, the article carry section moves at a constant velocity in an oscillating operation thereof.

This article carrying apparatus is configured such that, when the velocity at which the article carry section moves upward is increasing, the article carry section moves at a constant velocity in the oscillating operation. When the velocity of the upward movement of the article carry section is increasing, the article on the article carry section is pressed against the article carry section, and thus the contact pressure between the article carry section and the article increases, resulting in an increase in the friction therebetween. Therefore, in such a case, if the article carry section moves at a constant velocity in the oscillating operation, then sliding of the article with respect to the article carry section can be inhibited, and thus the article can be carried actively in the carrying direction.

In this article carrying apparatus, it is preferable that, when the article carry section is moving in a reverse direction from a carrying direction of the article in the oscillating operation, the velocity at which the article carry section moves downward increases.

This article carrying apparatus is configured such that, when the article carry section is moving in the reverse direction of the carrying direction of the article in the oscillating operation, the velocity at which the article carry section moves downward increases. When the velocity of the downward movement of the article carry section is increasing, the contact pressure between the article carry section and the article decreases, resulting in a decrease in the friction therebetween, and thus the article slides over the article carry section easily. Therefore, by increasing the velocity of the downward movement of the article carry section when the article carry section is moving in the reverse direction from the carrying direction of the article in the oscillating operation, the article slides with respect to the article carry section and thus is inhibited from moving in the reverse direction from the article carrying direction, and consequently, the article can be carried efficiently in the carrying direction.

Hereinafter, an embodiment of the present invention shown in the drawings is described.

Figure 2:
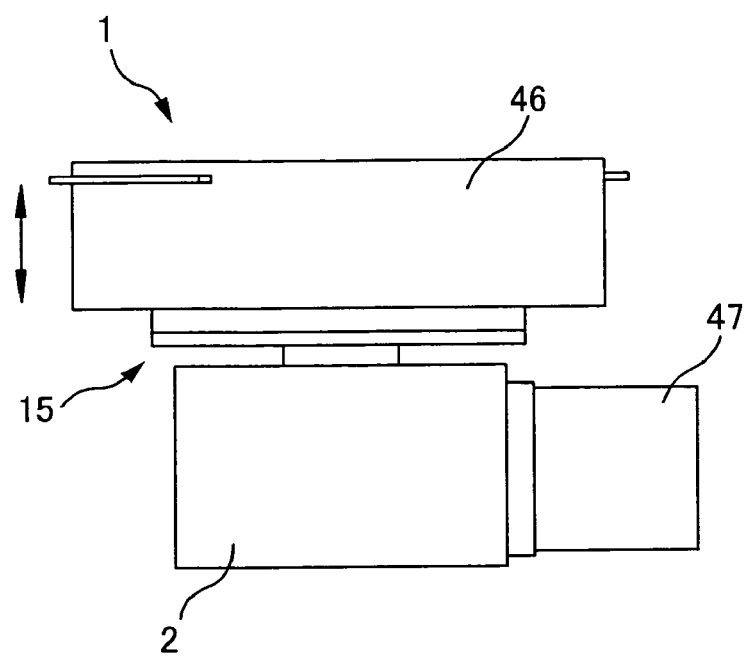
FIG. 2 is a front view of FIG. 1.
Figure 3:
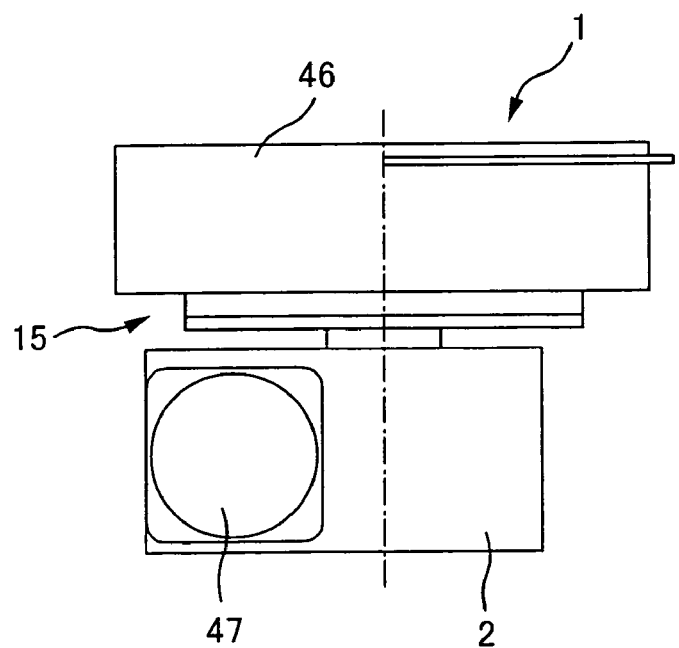
FIG. 3 is a side view of FIG. 1.
Figure 4:
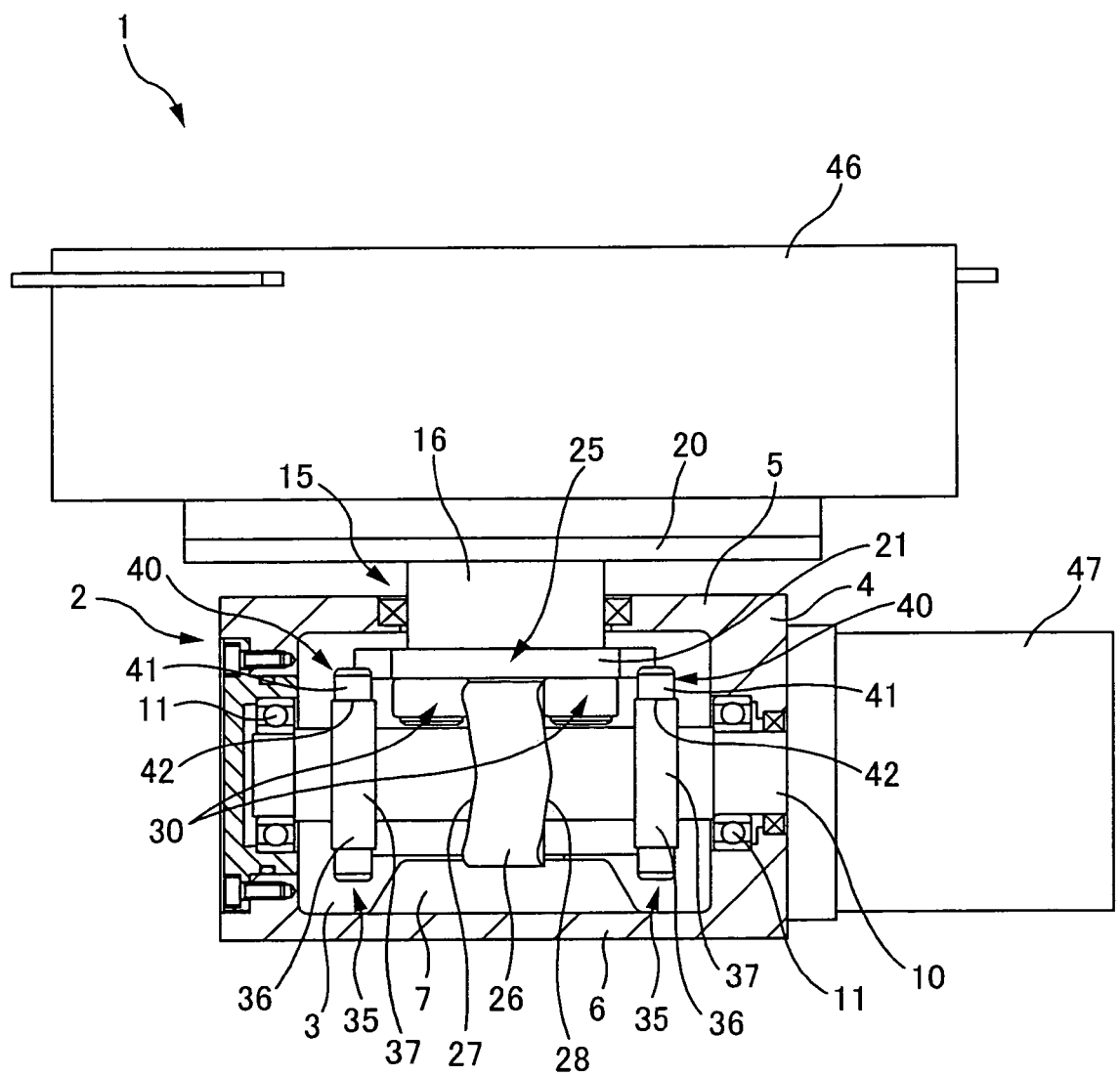
FIG. 4 is a front view of an internal structure.
Figure 5:
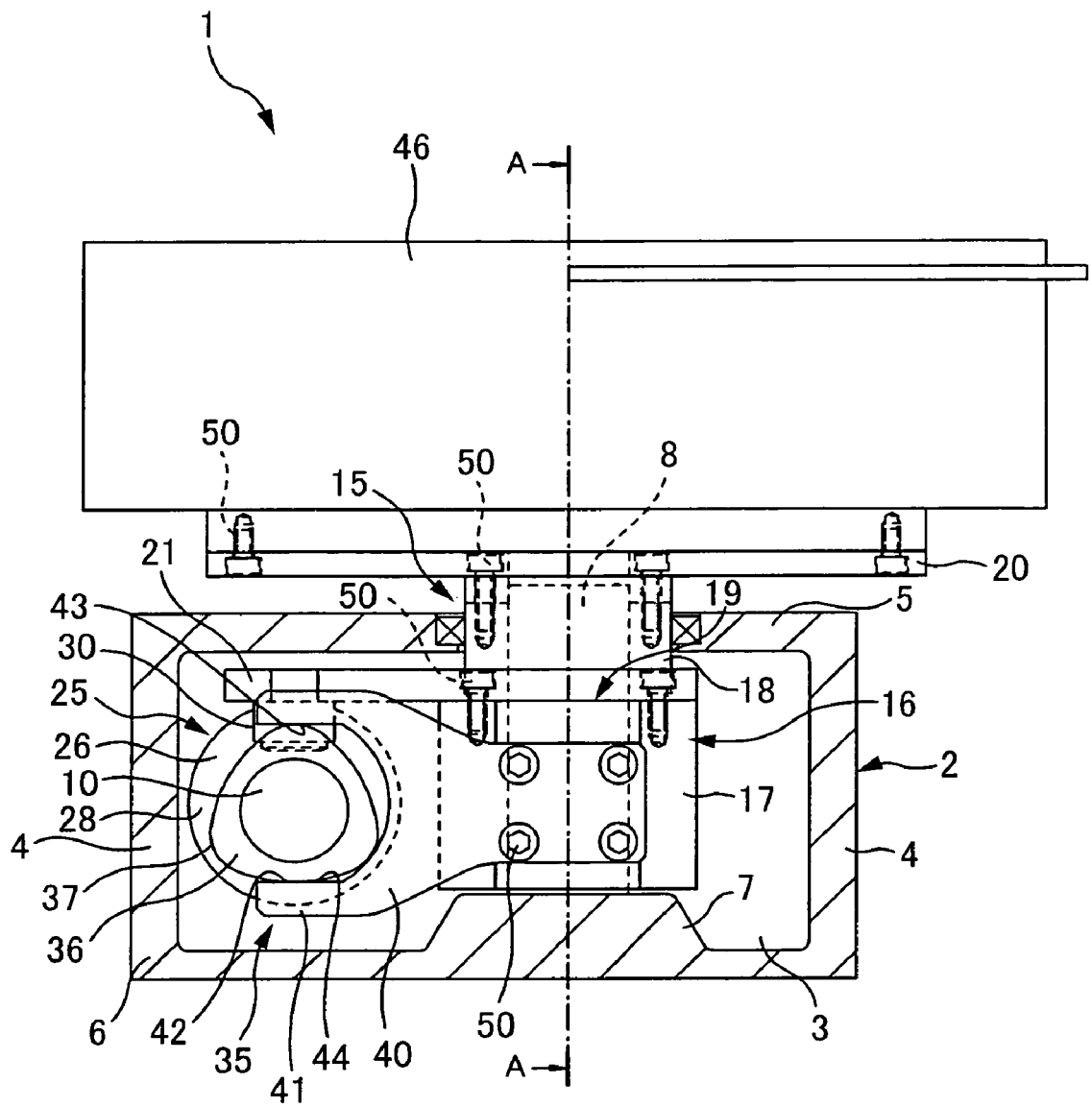
FIG. 5 is a side view of the internal structure.
Figure 6:
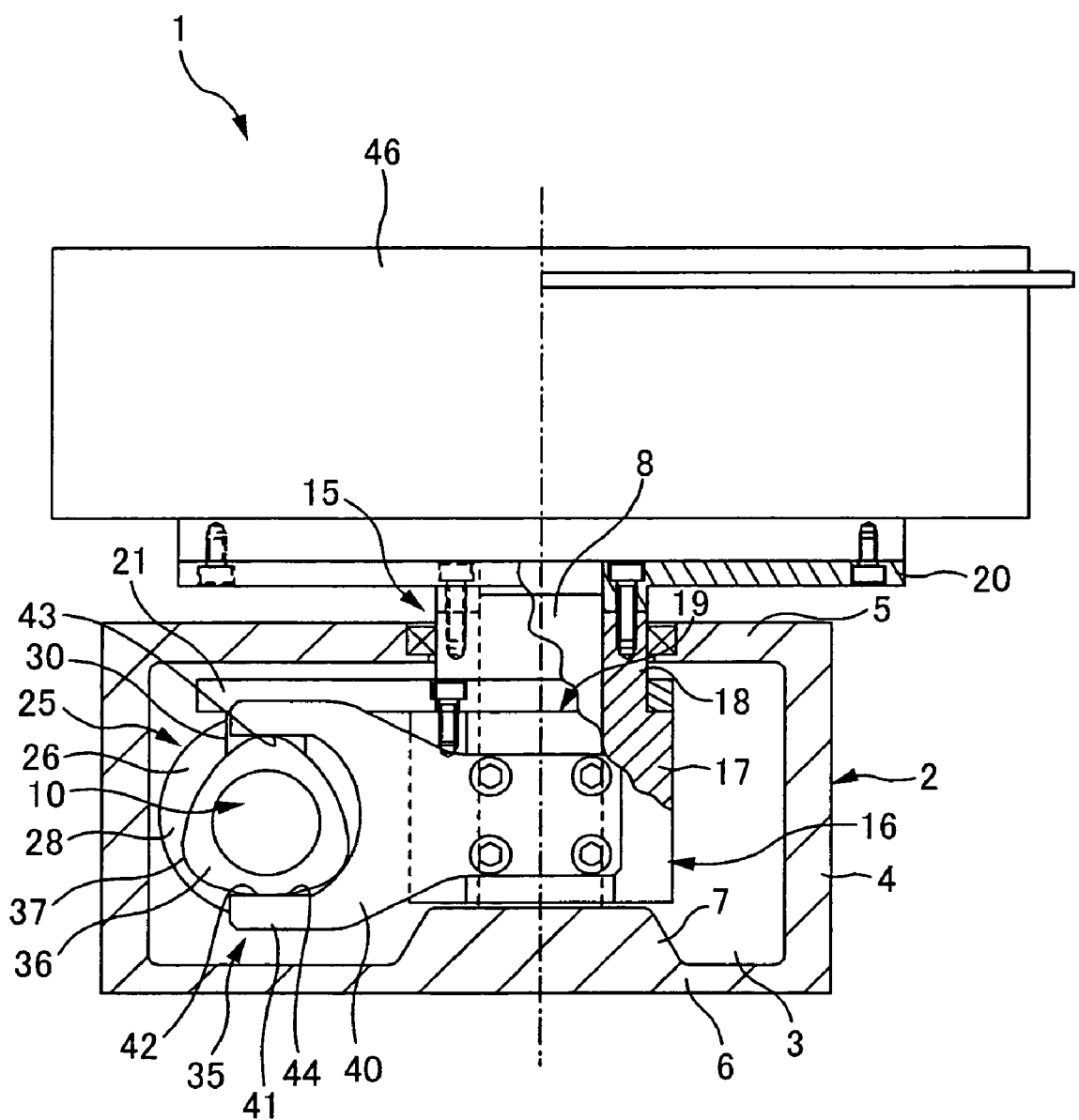
FIG. 6 is a side view of the internal structure.
Figure 7:
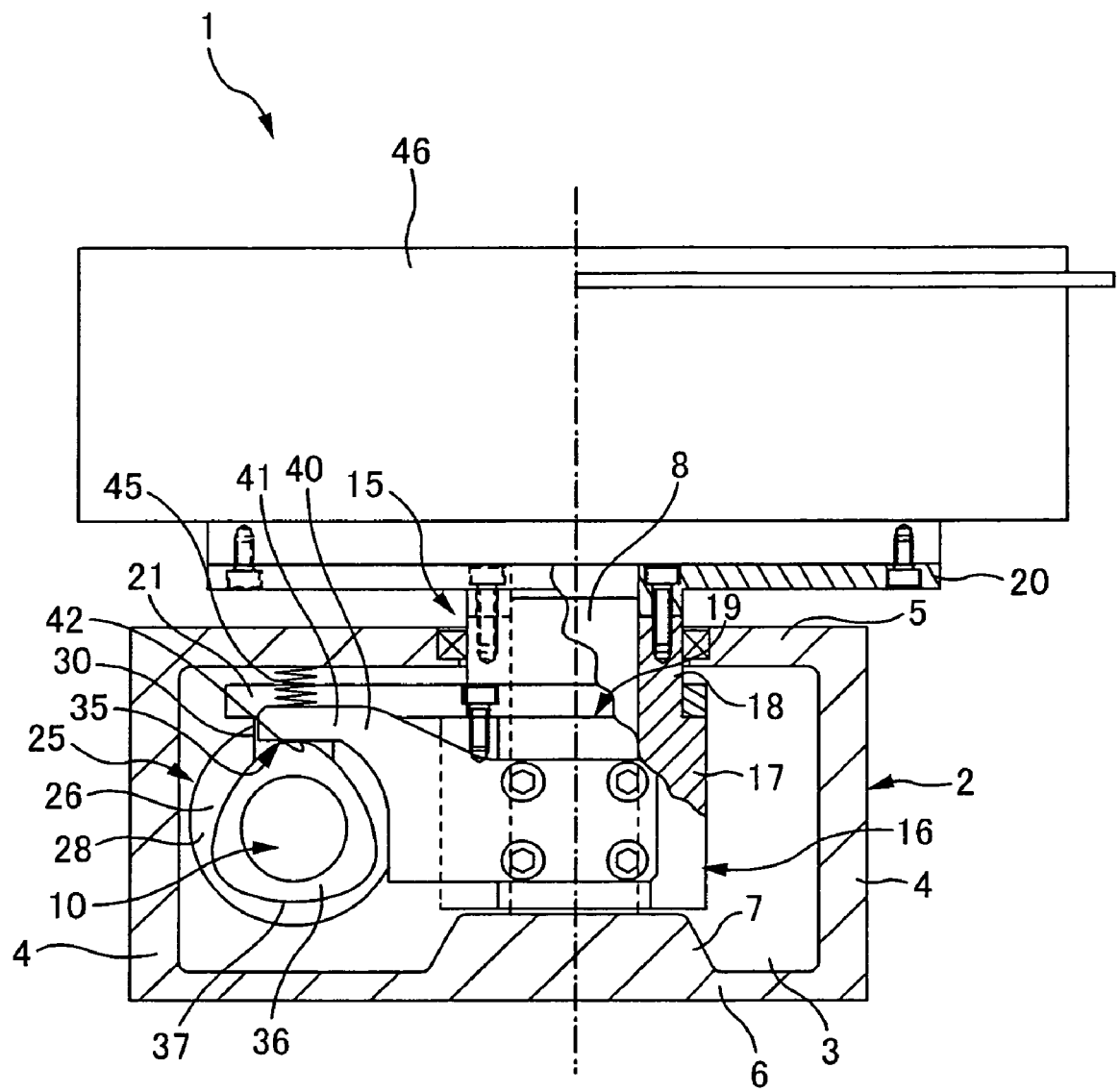
FIG. 7 is a side view of an internal structure of a variant example.
Figure 8:
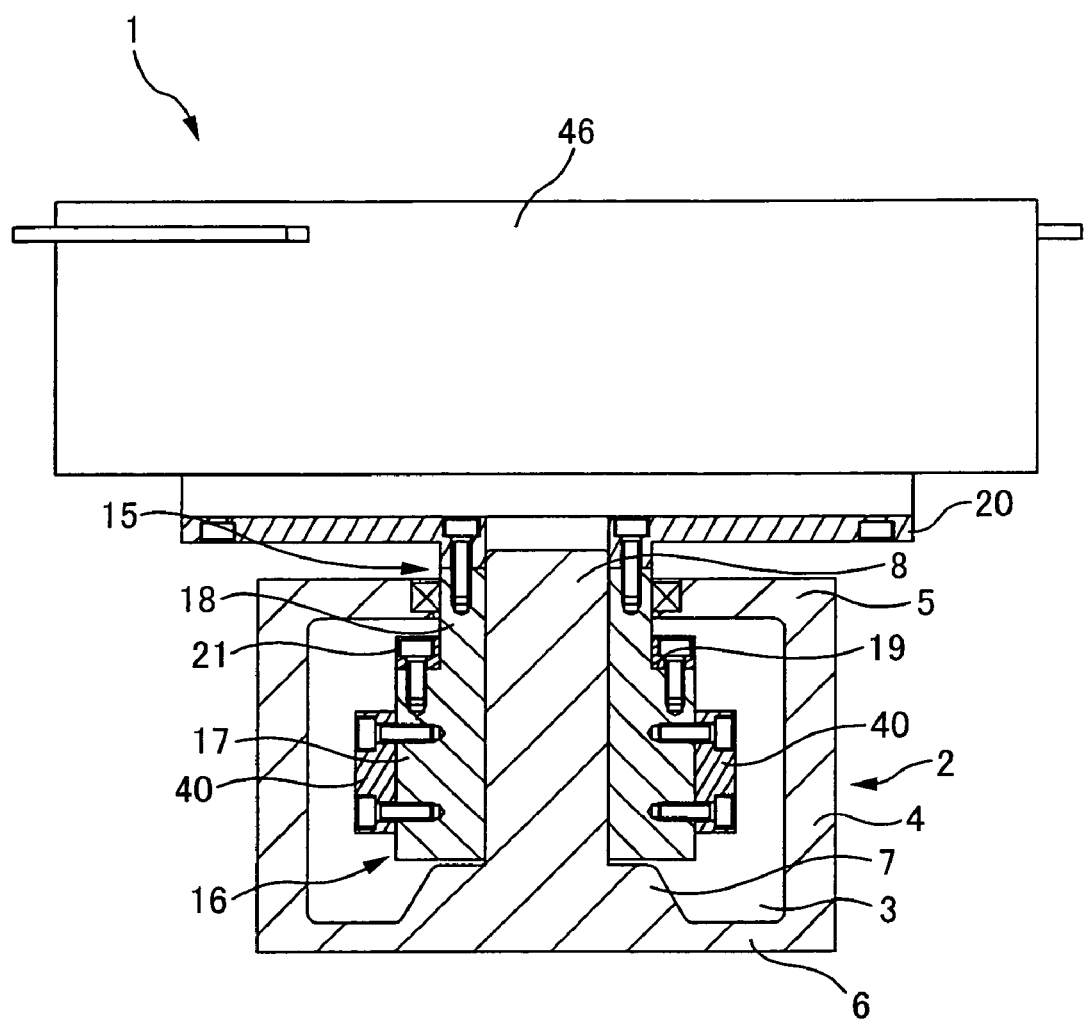
FIG. 8 is a cross-sectional view taken along the line A-A in FIG. 5.
Figure 9:
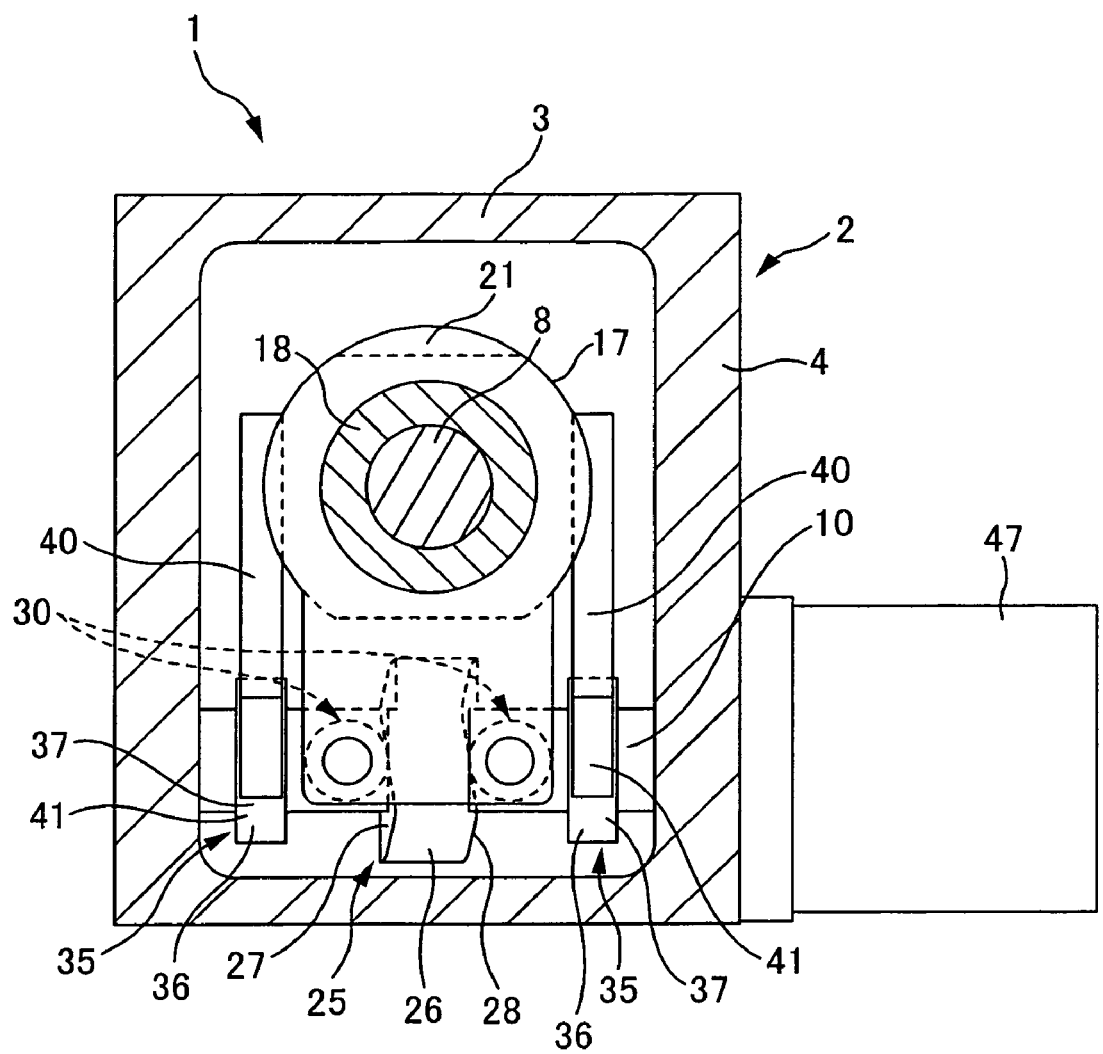
FIG. 9 is a plan view of the internal structure.

FIGS. 1 to 10 show an embodiment of the article carrying apparatus according to the present invention. FIG. 1 is a plan view showing the entire article carrying apparatus, FIG. 2 is a front view of FIG. 1, FIG. 3 is a side view of FIG. 1, FIG. 4 is a front view of an internal structure, FIG. 5 is a side view of the internal structure, FIG. 6 is a side view of the internal structure, FIG. 7 is a side view of an internal structure of a variant example, FIG. 8 is a cross-sectional view taken along the line A-A in FIG. 5, FIG. 9 is a plan view of the internal structure, and FIG. 10, which is a side view of the internal structure, is an explanatory diagram showing a first cam mechanism.

That is, this article carrying apparatus 1 includes, as shown in FIG. 4 and FIG. 5, a housing 2, an input shaft 10 that is rotatably provided in the housing 2, an output section 15 that is provided in the housing 2 in such a manner that the output section 15 can oscillate and reciprocate, a first cam mechanism 25 that moves in conjunction with the input shaft 10 and oscillates the output section 15, and a second cam mechanism 35 that moves in conjunction with the input shaft 10 and reciprocates the output section 15, and an article carry section 46 that oscillates and reciprocates integrally with the output section 15.

The housing 2, as shown in FIGS. 4 to 10, is a box-shaped housing internally having a sealed space 3. The input shaft 10 is provided horizontally and rotatably in one end portion within the space 3. In the central portion within the space 3 that is adjacent to the input shaft 10, the output section 15 is provided so that it can be oscillated in the horizontal direction and so that it can be reciprocated in the up-and-down direction (vertical direction). The first cam mechanism 25 and the second cam mechanism 35 are provided between the output section 15 and the input shaft 10.

The input shaft 10, as shown in FIG. 4, is axially supported between opposed side wall sections 4 of the housing 2 via a pair of bearings 11 so as to be rotatable, with one end portion of the input shaft 10 penetrating through one of the side wall sections 4 and projecting to the outside of the housing 2. The projecting portion is connected to a driving shaft (not shown) of a drive motor 47 attached to the outer face of the housing 2, so that the input shaft 10 is driven to rotate via the driving shaft by driving the drive motor 47.

On the center of a bottom section 6 within the space 3 of the housing 2, as shown in FIGS. 5 to 10, a pedestal section 7 having a truncated conical shape is integrally provided. A cylindrical support shaft 8 is vertically installed upright on the center of this pedestal section 7, and the output section 15 is supported by this support shaft 8 so that it can be oscillated in the horizontal direction and so that it can be reciprocated in the up-and-down direction.

An upper end portion of the support shaft 8, as shown in FIG. 8, penetrates through a top cover section 5 of the housing 2 and projects to the outside of the housing 2, and a disk-shaped, bowl mounting plate 20 of the output section 15, which is described below, is turnably positioned on that projecting portion. The support shaft 8 may be formed integrally with the bottom section 6 of the housing 2, or may be formed separately from the bottom section 6 of the housing 2 and then connected integrally to the bottom section 6 of the housing 2 by a connecting method such as welding or screwing.

The output section 15, as shown in FIGS. 4 to 10, is mounted on a portion of the support shaft 8 that is located within the space 3 so as to be turnable and reciprocatable in the up-and-down direction. The output section 15 is constituted by a cylindrical turret 16 whose upper end portion projects slightly from the top cover section 5 of the housing 2 to the outside of the housing 2, and the bowl mounting plate 20 that is connected integrally to the upper end portion of the turret 16 projecting from the top cover section 5 of the housing 2 to the outside of the housing 2.

The outer circumferential surface of the turret 16, as shown in FIGS. 5 to 10, is formed as a two-stage structure having a large diameter section 17 and a small diameter section 18. An upper end portion of the small diameter section 18 of the turret 16 penetrates through the top cover section 5 of the housing 2 and projects to the outside of the housing 2. The bowl mounting plate 20 is attached integrally to an end face of the projecting portion with bolts 50, and the bowl 46, which is the article carry section, is mounted integrally on the top of this bowl mounting plate 20.

There is no particular limitation regarding the shape of the bowl 46, and in this embodiment, a type of the bowl having a tubular shape whose lower end is closed and having, in a portion of its circumferential surface, a gate connecting the inside to the outside is used.

A boundary section between the large diameter section 17 and the small diameter section 18 of the turret 16 is formed as a ledge section 19, which is an annular plane perpendicular to the axis of the turret 16. First contact elements 30, which are components of the first cam mechanism 25 described below, are attached integrally to this ledge section 19 via an oscillating arm 21. Second contact elements 40, which are components of the second cam mechanism 35 described below, are attached integrally to the outer circumferential surface of the large diameter section 17 of the turret 16.

The first cam mechanism 25, as shown in FIGS. 4 to 10, is constituted by a first cam 26 that is provided integrally on the center of the input shaft 10 and that is driven to rotate integrally with the input shaft 10, and a pair of the first contact elements 30 that mutually engages with the first cam 26. The output section 15 and the bowl 46 are oscillated in the horizontal direction by the first cam 26 and the pair of first contact elements 30 working in cooperation.

The first cam 26 is constituted by a disk-shaped rib cam; one of the side surfaces of the first cam 26 is formed as a first cam face 27 extending over its entire circumference, and the other side surface of the first cam 26 is formed as a second cam face 28 extending over its entire circumference. The first cam face 27 and the second cam face 28 are formed as curved surfaces curved in the axial direction of the input shaft 10 and vertically rising from the outer circumferential surface of the input shaft 10. The first cam face 27 and the second cam face 28 are formed as an identical curved surface.

The pair of first contact elements 30, as shown in FIGS. 4 to 10, is attached integrally to the turret 16 via the oscillating arm 21. The oscillating arm 21 has a substantially rectangular plate-like shape, and a first end portion (one end portion) thereof in the longitudinal direction is attached to the ledge section 19 of the turret 16 with the bolts 50 so that a second end portion (the other end portion) in the longitudinal direction is in opposition to the first cam 26 with a predetermined spacing in the up-and-down direction. The first end portion of the oscillating arm 21 in the longitudinal direction is formed in a circular shape whose external shape has substantially the same diameter as the large diameter section 17 of the turret 16, and at the center of this circular portion, a hole into which the small diameter section 18 of the turret 16 is inserted is provided. The first end portion of the oscillating arm 21 is fastened to the ledge section 19 of the turret 16 by the bolts 50 with the small diameter section 18 inserted into this hole.

On the lower face of the second end portion of the oscillating arm 21, a pair of cam followers 31, which are the first contact elements 30, is attached with a predetermined spacing in the horizontal direction (axial direction of the input shaft 10) so that the axis of each cam follower is in the vertical direction (direction perpendicular to the axis of the input shaft).

Figure 10:
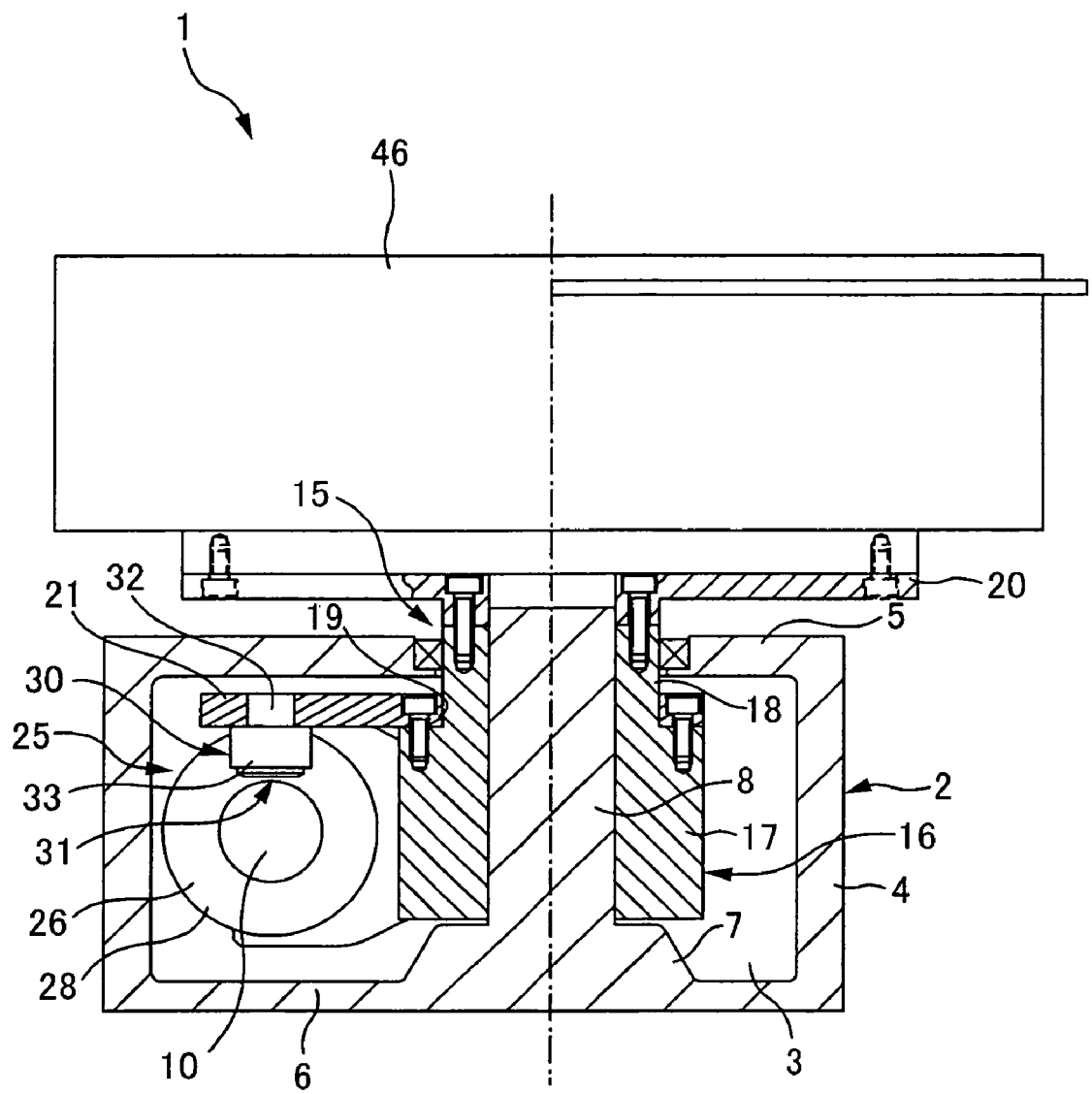
FIG. 10, which is a side view of the internal structure, is an explanatory diagram showing a first cam mechanism.

Each cam follower 31, as shown in FIG. 10, is constituted by a support shaft 32 that is attached to the oscillating arm 21 by such a method as fitting or screwing, and a roller 33 that is rotatably supported by the support shaft 32. The spacing between the two cam followers 31 in the horizontal direction is adjusted so that the circumferential surface of the roller 33 of one of the cam followers 31 is constantly in contact with the first cam face 27 of the first cam 26 so as to be rotatively movable thereon, and the circumferential surface of the roller 33 of the other cam follower 31 is constantly in contact with the second cam face 28 so as to be rotatively movable thereon.

Figure 12:
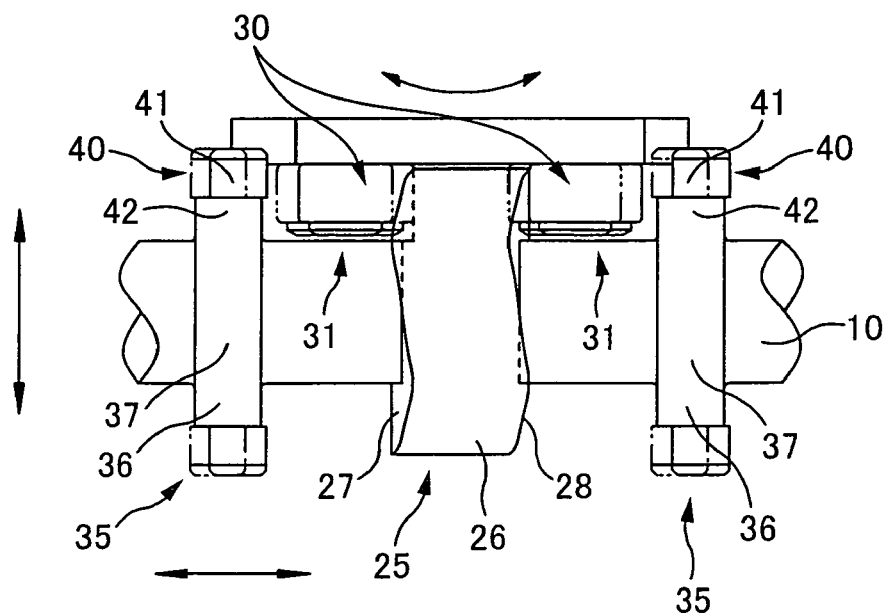
FIG. 12 is an explanatory diagram showing the operation of the first cam mechanism and the second cam mechanism.

When the input shaft 10 is driven to rotate by driving the drive motor 47, as shown in FIG. 12, the first cam 26 is driven to rotate integrally with the input shaft 10, and the rollers 33 of the cam followers 31 rotatively move on the first cam face 27 and the second cam face 28 of the first cam 26, respectively, while maintaining a contact state therewith, so that the oscillating arm 21 oscillates in the horizontal direction around the axis of the support shaft 8 according to the curved surface shape of the first cam face 27 and the second cam face 28, and the output section 15 and the bowl 46 oscillate in the same direction via the oscillating arm 21.

Since the two cam followers 31 are configured so as to allow for an adjustment of the spacing between them, the contact pressure between the respective rollers 33 of the cam followers 31 and the first cam face 27 and the second cam face 27 can be controlled to a predetermined value by adjusting the spacing between the two cam followers 31. Thus it is possible to create a pre-load state in which backlash is prevented from occurring.

The second cam mechanism 35, as shown in FIGS. 4 to 10, is constituted by: a pair of second cams 36 each of which is provided on the input shaft 10 and on the outer side of the first cam 26 and driven to rotate integrally with the input shaft 10; and a pair of the second contact elements 40 that mutually engages, respectively, with the two second cams 36. The second cam mechanism 35 can reciprocate the output section 15 and the bowl 46 in the up-and-down direction (vertical direction) by the second cams 36 and the pair of second contact elements 40 working in cooperation.

Each second cam 36 is a plate cam whose outer circumferential surface is formed as a cam face 37. This cam face 37 is formed as a series of curved surfaces that are curved in a direction perpendicular to the axis of the input shaft 10 and that are flat in the axial direction of the input shaft 10. Each second contact element 40 is constantly in contact with this cam face 37 such that it can slide in a direction parallel to the rotation axis of the second cam.

Each second contact element 40 has, as shown in FIG. 5 and FIG. 6, a plate-like shape having at its one end portion a U-shaped engagement section 41. As shown in FIG. 4 and FIG. 8, the other end portion of the second contact element 40 is attached to the outer circumferential surface of the large diameter section 17 of the turret 16 with the bolts 50 so that the second contact elements 40 are disposed with a predetermined spacing therebetween in the horizontal direction (axial direction of the input shaft 10) and parallel to each other.

The inner surface 42 of the engagement section 41 of each second contact element 40, as shown in FIG. 5 and FIG. 6, is formed in a 90°-rotated U shape, and the second cam 36 engages with the inner surface 42 of this U-shaped engagement section 41 with its cam face 37 in constant contact with this inner surface 42. In this case, upper and lower portions of the inner surface 42 of the engagement section 41 are respectively formed as flat faces 43 and 44 lying in the horizontal direction, and the cam face 37 of the second cam 36 is constantly in contact with these two flat faces 43 and 44.

Figure 11:
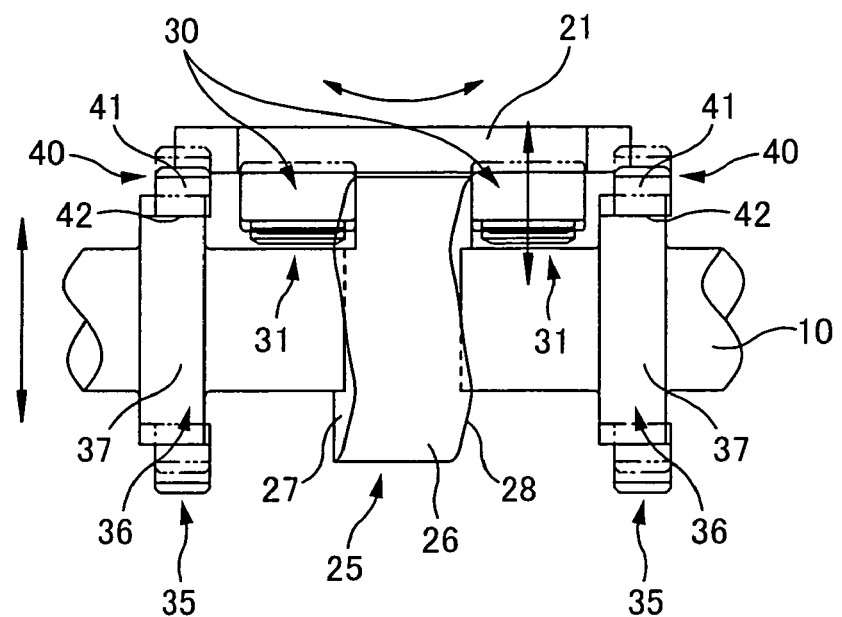
FIG. 11 is an explanatory diagram showing the operation of the first cam mechanism and a second cam mechanism.

When the input shaft 10 is driven to rotate by driving the drive motor 47, as shown in FIG. 11, the second cams 36 are driven to rotate integrally with the input shaft 10, and the cam faces 37 of the second cams 36 slide over the inner surfaces 42 of the engagement sections 41 of the second contact elements 40 in the rotating direction and the axial direction of the input shaft 10, so that the second contact elements 40 reciprocate in the up-and-down direction according to the shape of the cam faces 37 of the second cams 36, and the output section 15 and the bowl 46 reciprocate in the same direction via the second contact elements 40.

When the output section 15 is oscillated by the first cam mechanism 25, the cam face 37 of each second cam 36 slides along the inner surface 42 (upper flat face 43 and lower flat face 44) of the engagement section 41 in a direction parallel to the rotation axis of the second cam while maintaining engagement with the inner surface 42 of the engagement section 41. Therefore, the second cam mechanism 35 does not prevent the reciprocating motion of the output section 15 during the oscillating operation of the output section 15.

Moreover, when the output section 15 is reciprocated in the up-and-down direction by the second cams 36 and the second contact elements 40 of the second cam mechanism 35 working in cooperation, the rollers 33 of the pair of cam followers 31, which are the first contact elements 30 of the first cam mechanism 25, respectively move on the first cam face 27 and the second cam face 28 of the first cam 26 in a direction perpendicular to the axis of the input shaft 10 while maintaining a contact state with the first cam face 27 and the second cam face 28, so that unintended oscillating operation is not added to the reciprocating operation of the output section 15. Therefore, the articles in the bowl 46 can be carried efficiently and correctly.

As shown in FIG. 7, it is also possible for the second contact element 40 of the second cam mechanism 35 to have a configuration in which the engagement section 41 is formed in a shape of the letter I and also a compression spring 45, which serves as a biasing member, is installed between the upper end of this I-shaped engagement section 41 and the top cover section 5 of the housing 2 so that the biasing force of this compression spring 45 brings the inner surface 42 of the engagement section 41 into constant contact with the cam face 37 of the second cam 36 by pressurizing.

The second cam mechanism 35 shown in FIGS. 4 to 6 is advantageous in that it is capable of causing the output section 15 to perform a plurality of cycles of oscillation and reciprocation during a single rotation of the input shaft 10 and that it is capable of inhibiting the engagement sections 41 of the second contact elements 40 from jumping with respect to the second cams 36. Moreover, although a certain limitation is imposed on the shape of the second cam 36 to make the cam face 37 on the outer circumferential surface of the second cam 36 engage with the inner surface 42 of the engagement section 41, the second cam mechanism 35 shown in FIG. 7 is advantageous because it is not subjected to such a limitation.

It should be noted that, though not shown in the drawings, it is also possible to form the second cam of the second cam mechanism in the shape of a narrow edge and to form the second contact element in a shape that is wider than the second cam. By combining the second cam and the second contact element having such shapes, the contact position between the second cam and the second contact element does not move during rotation of the second cam, and in this case, too, the same effect as in the case of the second cam mechanism shown in FIGS. 4 to 6 described above can be obtained.

Figure 13:
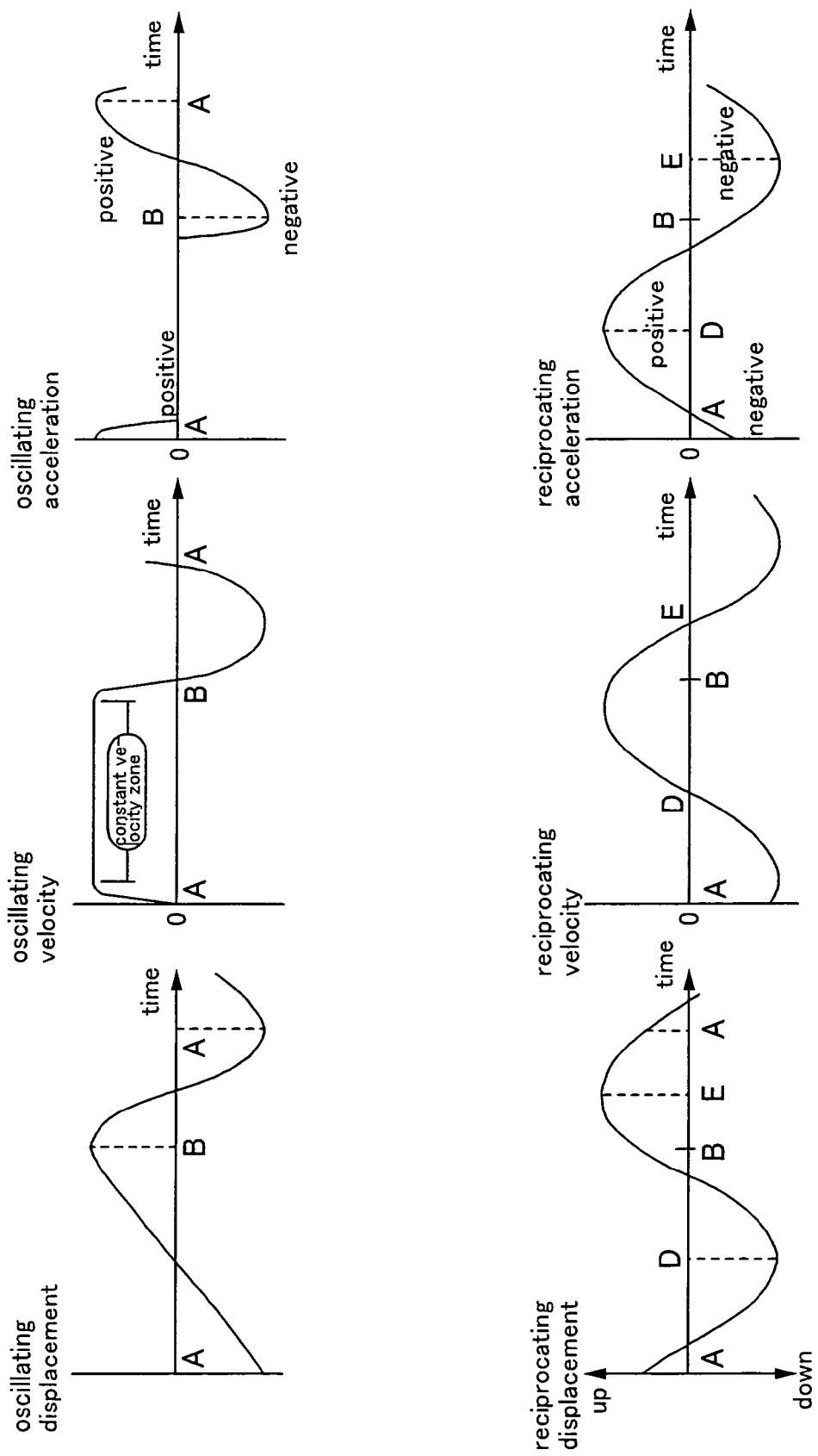
FIG. 13 shows timing charts of oscillation and reciprocation.
Figure 14:
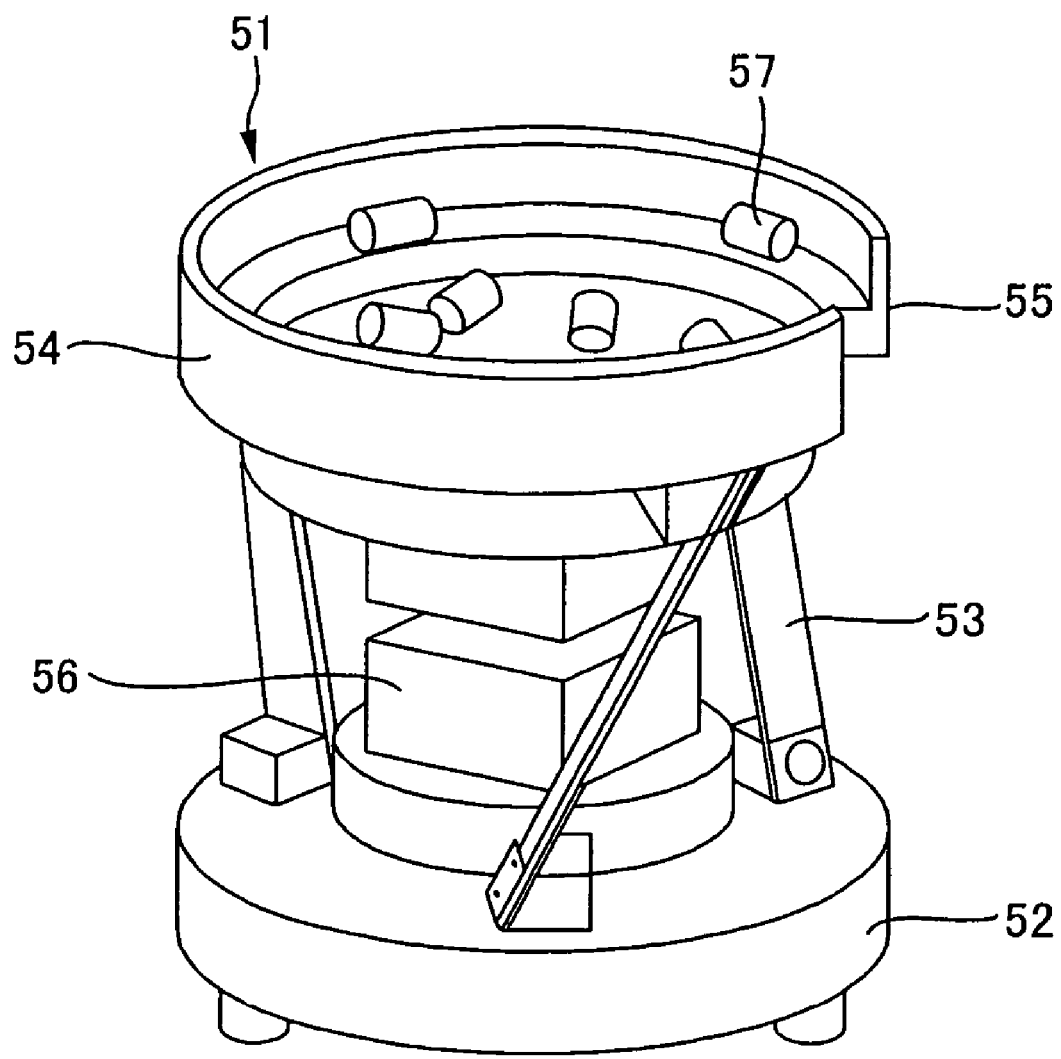
FIG. 14 is a perspective view showing an example of a conventional article carrying apparatus.

Next, the operation of the article carrying apparatus 1 according to this embodiment, which is configured as described above, is described with reference to FIGS. 11 to 13. FIG. 13 shows timing charts of oscillation and reciprocation. In FIG. 13, the timing charts of the upper half respectively show oscillating displacement versus time, oscillating velocity versus time, and oscillating acceleration versus time, in order from the left. The timing charts of the lower half respectively show up-and-down movement displacement versus time, up-and-down movement velocity versus time, and up-and-down movement acceleration versus time, in order from the left. The three figures of the upper half and the three figures of the lower half share identical time axes.

When the input shaft 10 is rotated by driving the drive motor 47, the first cam 26 of the first cam mechanism 25 and the second cams 36 of the second cam mechanism 35 rotate integrally with the input shaft 10. As a result, as shown in FIG. 12, the output section 15 and the bowl 46 are oscillated in the horizontal direction by the first cam 26 and the first contact elements 30 of the first cam mechanism 25 working in cooperation, while as shown in FIG. 11, the output section 15 and the bowl 46 are reciprocated in the up-and-down direction by the second cams 36 and the second contact elements 40 of the second cam mechanism 35 working in cooperation.

In the oscillating operation, the bowl 46 oscillates so as to move in the article carrying direction from a point A to arrive at a point B and then move in the reverse direction of the article carrying direction from the point B to arrive at the point A, as shown in FIG. 13. That is, it oscillates in the horizontal direction between the point A and the point B.

At this time, the time required for the bowl 46 to move from the point A to the point B is longer than the time required for the bowl 46 to move from the point B to the point A. Therefore, it is possible to carry the articles forward. The reason for this is as follows: by increasing the time taken for the bowl 46 to move in the article carrying direction, the acceleration of the bowl 46 in the carrying direction can be suppressed, so that it is difficult for the articles on the bowl 46 to slide with respect to the bowl 46; conversely, when the bowl 46 moves in the reverse direction of the article carrying direction, the acceleration increases because of the rapid movement, so that it is easy for the articles on the bowl 46 to slide with respect to the bowl 46.

Moreover, as shown in FIG. 13, in the oscillating operation of the bowl 46, the bowl 46 moves at a constant velocity for a predetermined time during the period from when an article starts to move from the point A to when it arrives at the point B. During the time when the bowl 46 moves at a constant velocity, the force due to the acceleration of the bowl 46 is not exerted on the articles supported on the bowl 46, and thus sliding of the articles with respect to the bowl 46 does not occur. Therefore, it is possible to inhibit sliding of the articles at least during the constant velocity movement.

Next, reciprocation of the bowl 46 in the up-and-down direction (vertical direction) is described.

As shown in FIG. 13, when the bowl 46 is positioned at the point A, the bowl 46 is in the process of being lowered. The bowl 46 further continues to be lowered and arrives at a lowermost point D. The bowl 46 arriving at the point D is then raised, and arrives at an uppermost point E. In this manner, the bowl 46 performs reciprocation in the up-and-down direction between the point D and the point E.

Next, the relationship between the oscillation and the reciprocation is described.

As shown in FIG. 13, when the velocity at which the bowl 46 moves in the up-and-down direction is increasing, that is, when the reciprocating acceleration is positive, the bowl 46 moves at a constant velocity in the oscillating operation in the horizontal direction.

Here, when the velocity at which the bowl 46 moves upward is increasing, the articles on the bowl 46 are pressed against the bowl 46. Moreover, when the bowl 46 is performing constant-velocity motion in the oscillating operation in the horizontal direction, the force due to the acceleration of the bowl 46 and acting on the articles in the horizontal direction does not occur. Therefore, in such a case, it is possible to reliably inhibit sliding of the articles with respect to the bowl 46.

Moreover, in the oscillating operation of the bowl 46, when the bowl 46 is moving in the reverse direction from the article carrying direction, the velocity at which the bowl 46 moves downward increases. That is, in the relationship, the reciprocating acceleration is negative.

Here, when the velocity at which the bowl 46 moves downward is increasing, the contact pressure between the articles on the bowl 46 and the bowl 46 decreases, and the friction therebetween decreases, so that the articles slides over the bowl 46 easily. Therefore, because the velocity of the downward movement of the bowl 46 increases when the bowl 46 is moving in the reverse direction from the article carrying direction in its oscillating operation, the articles slide with respect to the bowl 46 and thus are inhibited from moving in the reverse direction of the article carrying direction, and consequently, the articles can be carried in the carrying direction efficiently.

It should be noted that when the bowl 46 is lowered in the above-described reciprocation in the up-and-down direction, the maximum acceleration of the bowl 46 is preferably within the range that the articles on the bowl 46 do not float up with respect to the bowl 46. By setting the maximum acceleration within such a range, it is possible to inhibit generation of noise due to jumping of the articles on the bowl 46.

In the timing chart described above, the time required for the bowl 46 to move from the point A to the point B was longer than the time required for the bowl 46 to move from the point B to the point A, and furthermore, in the oscillating operation of the bowl 46, the bowl 46 was configured so as to move at a constant velocity for a predetermined time during the period from when an article starts to move from the point A to when it arrives at the point B. However, it is also possible to employ a common timing chart, that is, a timing chart represented as a sine curve or a harmonic motion curve in which the time required for the bowl 46 to move from the point A to the point B is equal to the time required for the bowl 46 to move from the point B to the point A.

Even when such a common timing chart is employed, since the first cam mechanism 25 and the second cam mechanism 35 are provided in this embodiment, the oscillating operation and the reciprocating operation can be set freely (independently) by means of these two cam mechanisms 25 and 35. Therefore, by setting the shapes of the components (first cam 26 and first contact elements 30) of the first cam mechanism 25 and the components (second cams 36 and second contact elements 40) of the second cam mechanism 35 appropriately according to the working condition, article carrying efficiency can be increased significantly.

It should be noted that in the foregoing description, the rib cam was used as the first cam 26, but the first cam 26 is not limited to the rib cam. It is also possible to use a grooved cam or the like, and in this case, too, the same effect is of course achieved.

Although the preferred embodiment of the present invention has been described in detail, it should be understood that various changes, substitutions and alterations can be made therein without departing from spirit and scope of the inventions as defined by the appended claims.

What is claimed is:

1. An article carrying apparatus for carrying an article, comprising:
   a housing;
   an input shaft rotabably supported by said housing;
   an output section supported by said housing in such a manner that said output section can oscillate and reciprocate;
   an article carry section that oscillates and reciprocates integrally with said output section;
   a first cam mechanism that moves in conjunction with said input shaft and oscillates said output section, the first cam mechanism being provided on and rotating integrally with said input shaft, wherein said first cam mechanism includes a first cam having a cam face formed on side sufaces thereof that maintains a contact state with said output section during reciprocation of said output section, and a contact position at which said output section and said cam face contact one another moves in the same direction as reciprocating direction in which said output section reciprocates; and
   a second cam mechanism that moves in conjunction with said input shaft and reciprocates said output section,
   wherein said first cam mechanism includes a first contact element that is provided on said output section and moves integrally with said output section, the first contact element comprising a pair of cam followers; and
   wherein said cam followers are respectively in contact with the cam faces;
   characterized in that an axis of each of the cam followers is in a direction perpendicular to an axis of said input shaft; and
   in that the cam surfaces are formed as curved surfaces perpendicularly rising from the outer surface of the input shaft.

2. An article carrying apparatus according to claim 1, wherein said first cam mechanism is constituted by
   a first contact element that is provided to said output section and moves integrally with said output section, and
   the first cam that is provided on said input shaft, that rotates integrally with said input shaft, and that has on its side surface the cam face that is constantly in contact with said first contact element; and
   wherein, during reciprocation of said output section, the contact position between said first contact element and the cam face of said first cam moves in the same direction as the reciprocating direction of said output section while said first contact element and said cam face maintain the contact state.

3. An article carrying apparatus according to claim 2,
   wherein said output section is provided with a pair of the first contact elements;
   wherein the cam face is formed on both of the side surfaces of said first cam; and
   wherein said first contact elements are respectively in contact with the cam faces.

4. An article carrying apparatus according to claim 1, wherein said second cam mechanism is constituted by
   a second contact element that is provided to said output section and moves integrally with said output section, and
   a second cam that is provided on said input shaft, that rotates integrally with said input shaft, and that has on its circumferential surface a cam face that is constantly in contact with said second contact element; and
   wherein, during oscillation of said output section, a contact position between said second contact element and the cam face of said second cam moves in a direction parallel to a rotation axis of said second cam while said second contact element and said cam face maintain the contact state.

5. An article carrying apparatus according to claim 4,
   wherein said output section is provided with a pair of the second contact elements; and
   wherein said input shaft is provided with a pair of the second cams that respectively have on their circumferential surfaces the cam faces that are respectively in contact with said second contact elements.

6. An article carrying apparatus according to claim 4, wherein said second contact element is biased toward said second cam by a biasing member provided between said housing and said second contact element.

7. An article carrying apparatus according to claim 4, wherein said second contact element is provided with an engagement section for engaging with said second cam, and configured so that an inner surface of said engagement section and the circumferential surface of said second cam are constantly in contact with each other.

8. An article carrying apparatus according to claim 1, wherein said output section is configured so as to oscillate in the horizontal direction and reciprocate in the vertical direction.

9. An article carrying apparatus according to claim 8, wherein, when said article carry section oscillates integrally with said output section in a carrying direction of said article, a time required for said article carry section to move from a first point to a second point is set to be longer than a time required for said article carry section to move from said second point to said first point.

10. An article carrying apparatus according to claim 9, wherein, in an oscillating operation of said article carry section, said article carry section moves at a constant velocity for a predetermined time during a period from the start of movement of said article in said carrying direction to the end of said movement.

11. An article carrying apparatus according to claim 8, wherein, when the velocity at which said article carry section moves upward is increasing, said article carry section moves at a constant velocity in an oscillating operation thereof.

12. An article carrying apparatus according to claim 11, wherein, when said article carry section is moving in a reverse direction from a carrying direction of said article in said oscillating operation, the velocity at which said article carry section moves downward increases.

* * * * *